Patented Apr. 13, 1943

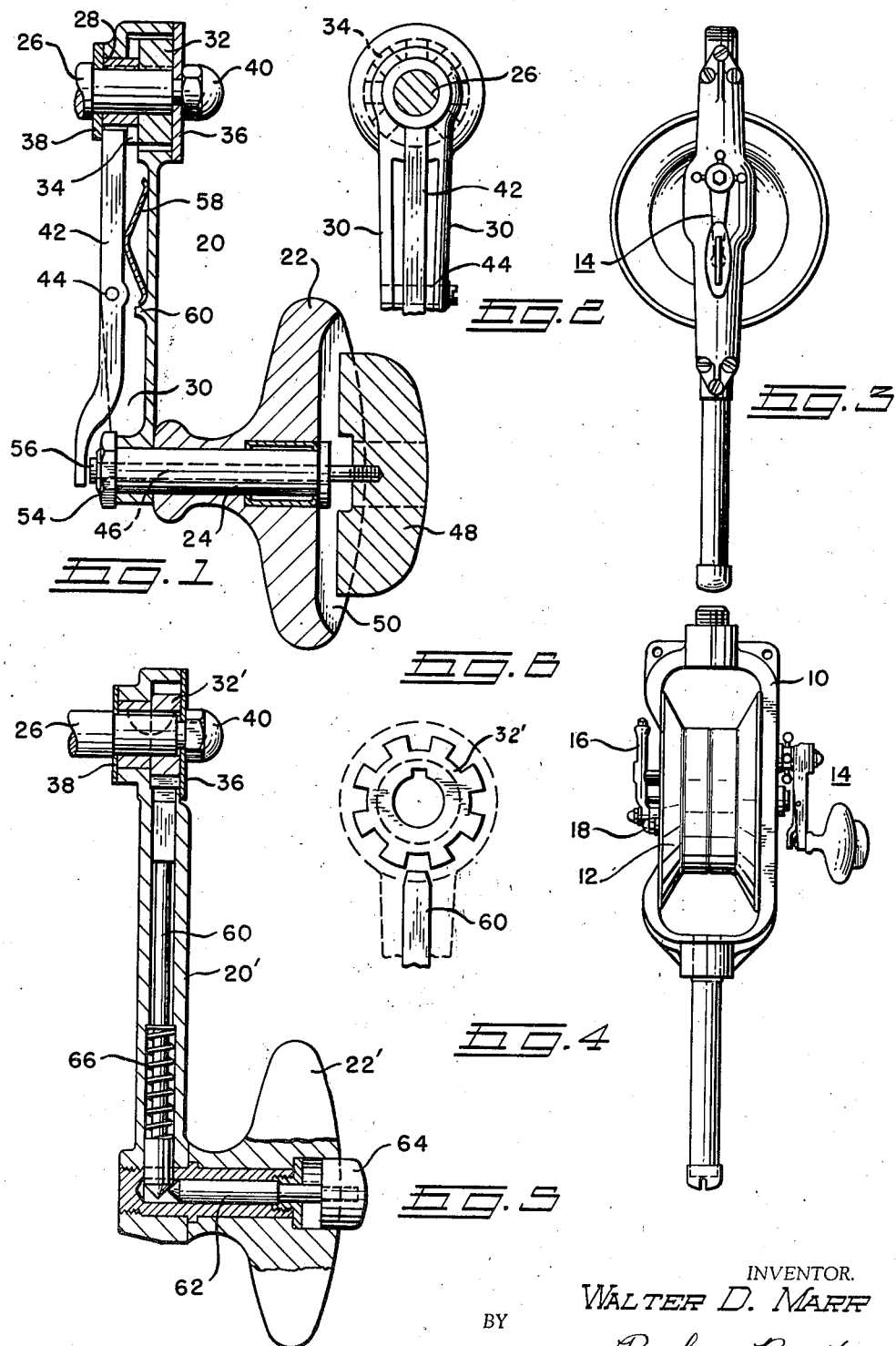

2,316,266

UNITED STATES PATENT OFFICE 2,316,266

HANDLE MECHANISM FOR REELS

Walter D. Marr, Flint, Mich.

Application December 18, 1940, Serial No. 370,699

5 Claims. (Cl. 74—548)

This invention relates to improvements in fishing reels and particularly to handle mechanisms for operating the same. The present application forms a continuation-in-part of my Patent No. 2,184,149, dated Dec. 21, 1939, and my copending application, Serial No. 253,568, filed January 30, 1939.

An important object of the present invention is to provide an improved handle or crank for fishing reels which under the control of the operator can be quickly and easily connected to or disconnected from the driving shaft of the winding drum. Another object of this invention is to provide a reel handle of the type described which can be used for long periods of time without tiring or injuring the hand of the operator. A further object of the invention is to provide improved construction which automatically disengages the handle from the winding drum driving shaft but allows the operator to instantly engage the handle with the driving shaft at any time he so desires.

Various other objects, advantages and meritorious features of the invention will become more fully apparent from the following specification, appended claims, and accompanying drawing, wherein:

Fig. 1 is a sectional view illustrating one type of my improved handle mechanism, Fig. 2 is a fragmentary elevational veiw of the handle arm shown in Fig. 1, Fig. 3 is a side elevation of a reel incorporating the handle structure illustrated in Figs. 1 and 2, Fig. 4 is a side elevation of the same reel taken at a 90° angle with respect to Fig. 3, Fig. 5 is a sectional view through a modified form of handle construction, and Fig. 6 is a fragmentary elevation of a portion of the locking mechanism of Fig. 5.

The handle of the present invention is particularly adapted for deep sea fishing reels. A reel of this character is illustrated in Figs. 3 and 4. This reel is like that described and claimed in my copending application which is an improvement in the reel described and claimed in my patent. The handle structure of the present invention is shown incorporated on the reel structure described in detail in my copending application. A general reference will therefore be made herein to the construction of the reel.

Referring to Figs. 3 and 4, the deep sea fishing reel comprises a yoke frame 10 in which is mounted a drum 12 about which the fishing line is wound and rewound. The drum is rotated to wind the line in by a crank or handle on the right side of the frame generally shown at 14. On the opposite side of the frame a brake control handle 16 and a gear selector knob 18 are located.

The winding drum is fixed to a shaft extending between the arms of the yoke frame. The handle in this particular type of reel is attached to a second shaft off side and preferably above the winding drum shaft. Selective gear change mechanism not shown in the drawing but described in my earlier cases referred to above operatively connects the shaft to which the handle is attached to the drum shaft. In certain instances the handle of this invention may be attached directly to the drum shaft. For this reason the shaft to which the handle mechanism is attached is referred to as the drive shaft, and it is understood that the term covers the invention irrespective of whether the handle is attached directly to the drum shaft or to a separate shaft connected to the windnig drum through suitable driving mechanism.

A highly desirable form of construction is that illustrated in Figures 1 and 2. In this construction, the handle mechanism includes a crank arm freely attached to the end of the driving shaft and a handle or knob freely attached to the arm which is grasped by the hands of the operator. The novel means used in this form to operatively couple the crank arm to the drive shaft comprises a member extending lengthwise of the crank arm and pivoted thereto for swinging or rocking movement about an axis intermediate its ends. In one position, the member locks the crank to the drive shaft for joint rotation; in another position the arm is disengaged and rotation of either one is ineffective on the other. The locking member is swung by novel control means associated with the knob and so disposed therein that it will not tire or injure the operator's hand during use.

Referring in detail to Figs. 1 and 2, the handle mechanism comprises the crank arm 20 and a hand gripping part or knob 22 freely rotatable on a bearing stud 24 fixed to the free end of the arm. The opposite end of the arm is attached to the reduced end of a drive shaft 26 and normally is free to turn about the axis of the shaft without effecting the latter. This is accomplished by providing a bushing 28 fixed on the drive shaft and shaping the attached end of the crank arm so that it will freely bear thereon for rotation.

As shown in Figs. 1 and 2, the crank arm is provided with a front face and two spaced parallel ribs 30—30 extending substantially the length thereof. At the connection of the arm to the drive shaft the ribs spread out and encircle the end of the shaft as shown in Fig. 2 to form a housing. Within the housing thus formed is an element 32 keyed to the end of the crank shaft. This element is provided with radial teeth 34 similar to a crown gear wheel. That is to say, the teeth open outwardly on one side of the element. In this particular instance the teeth open on the side of the element facing inwardly toward the reel. The teeth are arranged close together in a series around the axis of the shaft. They are shaped in a special way for receiving a movable locking member carried by the handle mechanism. To complete the assembly, washers 36 and 38 are provided on opposite sides of the housing formed by the ribs 30—30. Nut 40 on the end of the driving shaft holds the parts in assembled relation.

Disposed within the groove formed by the ribs 30—30 is a member 42 which functions to disconnectedly couple the handle mechanism to the drive shaft. This member extends the length of the arm and it is pivotally mounted intermediate its ends on a pivot pin 44 which is supported by the ribs 30—30. The upper end of member 42 extends far enough to engage the teeth in element 32. Preferably, as shown, this end is squared and the teeth of the element 32 shaped to receive the squared end without play. The other end of member 42 overlies the axis of the stud 24 about which the knob 22 turns. Stud 24 is axially bored and contains a pin 46 which projects beyond opposite ends of the stud member 24.

The knob 22 is shaped in a novel manner to ease the operator's grip and at the same time to facilitate immediate control over the operating connection between the handle to the drive shaft. The knob is actually composed of two parts, a larger egg-shaped member heretofore designated 22 and a smaller elongated member 48 fitted on the outer end of the pin 46. The egg-shaped member 22 is grooved along its long axis as at 50 to receive the smaller part 48. The groove opens out on the face of the knob and extends substantially the entire length of the egg-shaped part. The smaller member 48, which may be termed a button, is received in this groove and extends almost to the ends of the groove as Fig. 1 shows. The relation of the parts is such that when the smaller member is depressed in the groove 50 it forces the pin inwardly and rocks the locking member 42 about its pivotal axis sufficiently far enough to carry the upper end of the member in Fig. 1 into engagement with the teeth 34 of element 32. This will lock the handle mechanism to the drive shaft. Suitable means are provided for holding the parts of the knob in proper assembled relation. The stud 24 may be shouldered at one end as indicated at 52 and carry a nut 54 on the other end. The control pin 46 may have a head 56 as shown on the end adjacent the locking member 42.

When the knob 22 is gripped by the hand of the operator, the palm of the hand bears against the control member 48. By varying the squeeze of the hand it is possible to press member 48 inwardly or allow it to assume its normally projecting position shown in Fig. 1. When fishing, it may be necessary to operate the reel for a long period of time alternately winding the drum or allowing it to pay out. The shape of the parts of the knob is such that the operator can grip the handle and exert turning forces over a long period of time without tiring or injuring his hand.

Novel spring means normally holds the member in unlocked position and the control member 48 in projecting position. This spring means is in the form of a flat spring member 58 seated within the groove of the crank arm formed by the ribs 30—30. As shown, this spring bears against the part of the member 42 adjacent to the drive shaft and yieldingly urges the member out of engagement with the teeth of element 32. Thus when the operator's grip on the knob is loosened, the spring will automatically swing member 42 out of locking engagement with the drive shaft. A suitable shoulder 60 may be provided in the groove of the crank arm for assisting in the support of the spring.

The modified form of handle mechanism shown in Fig. 5 utilizes a bodily reciprocal member as distinguished from a rocking or swinging member in the previously described mechanism for locking the handle to the drive shaft. Similar parts in the two forms illustrated in the drawing are referred to by the same reference numerals. Referring to Fig. 5, the locking member is in the form of a plunger 60 reciprocating in the crank arm 20' which is in the form of a sleeve. The end of the plunger adjacent the crank shaft 26 is slightly tapered for engagement with a toothed wheel 32'. This wheel, like its counterpart 32 in the previously described modification, is keyed to the drive shaft and is enclosed within a housing formed by the handle. The opposite end of the plunger is tapered to a relatively sharp point. It engages a similarly tapered end of a pin 82 extending perpendicularly to the plunger and out through the end of the knob 22'. The pin carries a button 64 which normally projects from the surface of the knob.

A coiled spring 66 encircles the plunger 60 and exerts a yielding force tending to shift the plunger away from the drive shaft and disengage the plunger from the teeth of the wheel 32'. The spring likewise forces the button to its projecting position as shown. It is obvious that when the button is depressed it will by virtue of engagement of the tapered ends force the plunger upwardly against the resistance of the spring into locking engagement with the wheel 32'.

What I claim:

1. In a fishing reel, a winding drum driving shaft, a crank including a hand gripping part and an arm connecting the part to the driving shaft, means operable to couple the crank to the shaft to drive the latter or to disconnect the handle therefrom, said means including an element fixed to the shaft and provided with a series of teeth arranged around the axis of rotation of the shaft, said teeth opening outwardly in the plane of the element and on one side of the element, a member extending lengthwise of the arm of the crank, means pivoting the member intermediate its ends to an intermediate part of the crank arm, one end of said member extending as far as the toothed element and shaped for engagement with the teeth thereof, the other end of the member extending as far as the hand engaging part of the crank, spring means between the member and the crank arm yieldingly urging the end of the member out of engagement with the teeth of said element, and means reciprocatingly movable in said hand engaging part adapted to engage the adjacent end of the member and swing the other end thereof into engagement with the teeth of the element.

2. In a fishing reel, a winding drum driving shaft, a crank including a hand gripping control knob and an arm connecting the knob to the driving shaft, means for disconnectedly coupling the arm to the driving shaft including a movable part on the crank which in one position locks the crank to the driving shaft and in another position allows free rotation of the crank and shaft relative to one another, said knob being egg-shaped in general configuration and having an elongated slot along its major axis extending substantially from one end of the knob to the other and opening out through the surface of the knob against which the palm of the hand gripping the same is pressed, a control member reciprocatingly mounted in said knob and operable upon reciprocation to move said part to either one of its positions of movement, said member carrying an elongated control button extending substantially the length of said slot, said button normally projecting from the surface of said knob but being depressible by the palm of the hand gripping the knob into the slot.

3. In a fishing reel, a winding drum driving shaft, a crank arm having one end connected to said driving shaft but freely rotatable thereabout, means operable to couple the crank arm with the driving shaft to rotate the drum or disconnect the same therefrom, a hollow stud shaft carried on the opposite free end of the crank arm and projecting laterally therefrom generally parallel to the axis of the driving shaft, a knob carried on the projecting portion of said hollow stud shaft and having an opening in the face thereof in alignment with the stud shaft, said knob being freely rotatable about the axis of said stud shaft, a member reciprocal longitudinally through said stud shaft and adapted when shifted inwardly away from the face of the knob to engage said operable means and cause the latter to couple the crank arm to the driving shaft, means carried on the end of said member extending through said opening in the knob and beyond the face thereof and adapted to be pressed inwardly when the hand of the operator tightly grips the knob and thereby shifts the member inwardly to effect coupling of the crank arm with the driving shaft, and resilient means yieldingly resisting the coupling of said crank arm to said driving shaft and returning said member to its outwardly projecting position when pressure of the operator's hand is released therefrom.

4. In a fishing reel, a winding drum driving shaft, a crank arm having one end connected to said driving shaft but freely rotatable thereabout, means operable to couple the crank arm with the driving shaft to rotate the drum or disconnect the same therefrom, a hollow stud shaft fixed to the opposite free end of the crank arm and projecting laterally therefrom generally parallel to the axis of the driving shaft, a knob freely rotatable about the projecting portion of said hollow stud shaft and having an opening in the face thereof in alignment with the stud shaft, a member reciprocal longitudinally through said stud shaft and adapted when shifted inwardly away from the face of the knob to engage said operable means and cause the latter to couple the crank arm to the driving shaft, means carried on the end of said member extending through said opening in the knob and beyond the face thereof and adapted to be pressed inwardly when the hand of the operator tightly grips the knob and thereby shift the member inwardly to effect coupling of the crank arm with the driving shaft, and resilient means yieldingly resisting the coupling of said crank arm to said driving shaft and returning said member to its outwardly projecting position when pressure of the operator's hand is released therefrom.

5. In a fishing reel, a shaft, a crank for driving including a hand gripping part and an arm connecting the hand gripping part to the shaft, and coupling means operable to couple the crank to the shaft to drive the latter or to disengage the crank therefrom including a toothed part on the shaft and rotatable therewith and a member rockingly supported on the arm of the crank and adapted in one position of its rocking movement to engage said toothed member and couple the arm to said shaft and in another position to be disengaged from the tooth member, said hand gripping part having a recess in its outer face, a button mounted within said recess for depression inwardly thereinto or projection outwardly therebeyond, a connection between said button and said member operable upon depression inwardly of the button to rock said member to couple the arm to the shaft for driving, and spring means normally urging said member to uncouple the arm therefrom and to project the button outwardly beyond the face of the hand gripping part.

WALTER D. MARR.